United States Patent [19]

Hagstrom

[11] Patent Number: 4,962,685
[45] Date of Patent: Oct. 16, 1990

[54] PRODUCTION TABLE SAW
[76] Inventor: Oscar E. Hagstrom, 1132 Holly Oak Cir., San Jose, Calif. 95120
[21] Appl. No.: 263,053
[22] Filed: Oct. 27, 1988
[51] Int. Cl.$^5$ .......................... B26D 5/10; B27B 5/20
[52] U.S. Cl. .................................. 83/397; 83/435.1; 83/440.2; 83/444; 83/446; 83/477.2; 83/478; 83/490
[58] Field of Search ............... 83/397, 478, 471.2, 83/471.3, 477.2, 490, 435.1, 544, 438, 440.2, 444, 447, 446

[56] References Cited

U.S. PATENT DOCUMENTS

| | | | |
|---|---|---|---|
| 1,411,045 | 3/1922 | Leaver, Jr. | 83/478 |
| 1,640,517 | 8/1927 | Procknow | 83/478 |
| 1,670,946 | 5/1928 | Wolf | 83/478 |
| 1,821,113 | 9/1931 | Neighbour | 83/478 |
| 2,435,382 | 2/1948 | Caskey | 83/435.1 |
| 2,460,205 | 1/1949 | Webster | 83/438 |
| 2,488,077 | 11/1949 | Buday | 83/478 |
| 2,937,672 | 5/1960 | Gjerde | |
| 2,985,202 | 5/1961 | Wilson | 83/446 |
| 4,033,218 | 7/1977 | Donatelle | 83/397 |
| 4,184,394 | 1/1980 | Gjerde | 83/473 |
| 4,249,442 | 2/1981 | Fittery | 83/473 |
| 4,336,733 | 6/1982 | Macksoud | 83/477.2 |
| 4,385,539 | 5/1983 | Meyerhoefer et al. | 83/473 |

Primary Examiner—Frank T. Yost
Assistant Examiner—Scott A. Smith
Attorney, Agent, or Firm—Flehr, Hohbach, Test, Albritton & Herbert

[57] ABSTRACT

A production table saw is disclosed that includes a saw blade that is movable from an unexposed position that is fully received by a work stand to an exposed position wherein at least a portion of the blade is exposed through a blade slot in the working surface of the table. A foot operated mechanism that includes a foot pedal is provided to move the saw blade between the unexposed position to the exposed position which is suitable for cutting. The foot operated mechanism cooperates with a safety guard to protect the blade while the saw is in operation. The connection between the foot pedal and the safety guard is arranged to insure that the safety guard is always placed over the saw blade when the blade is exposed through the blade slot.

16 Claims, 9 Drawing Sheets

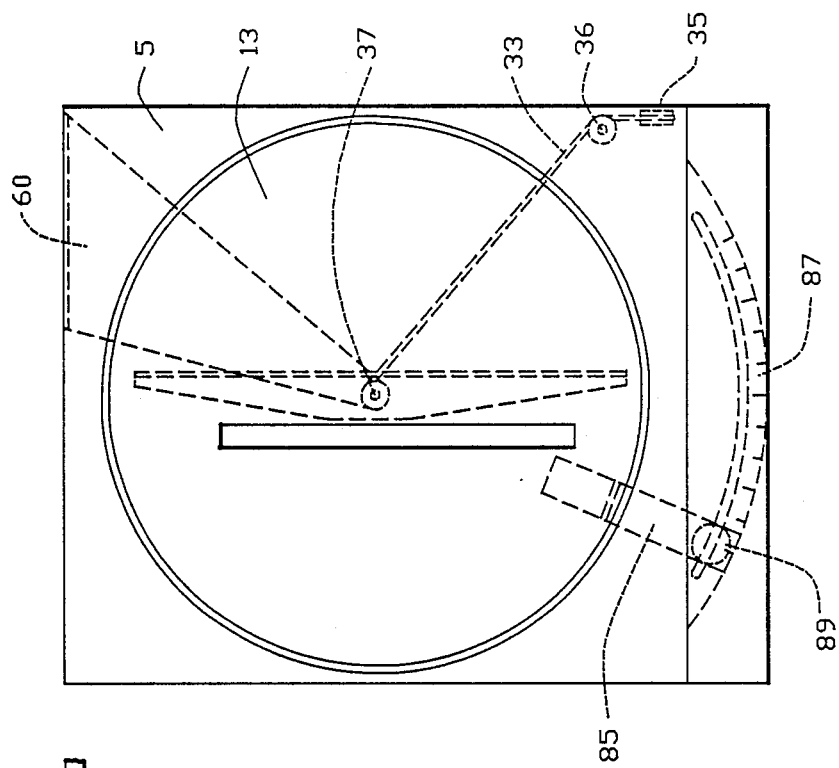
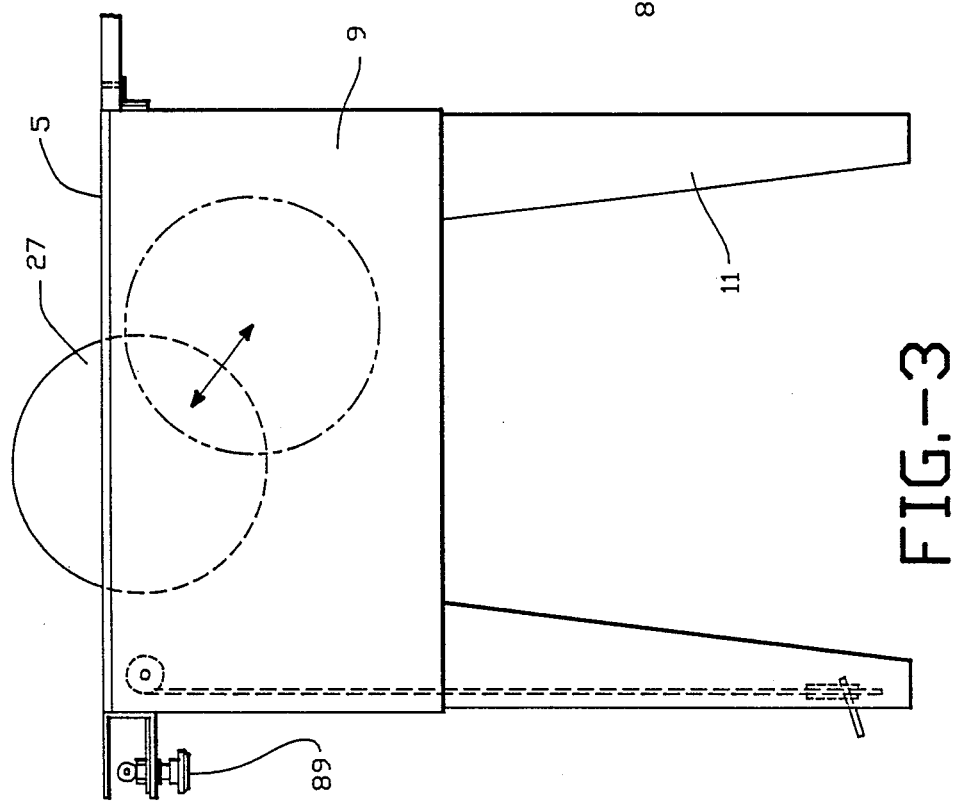

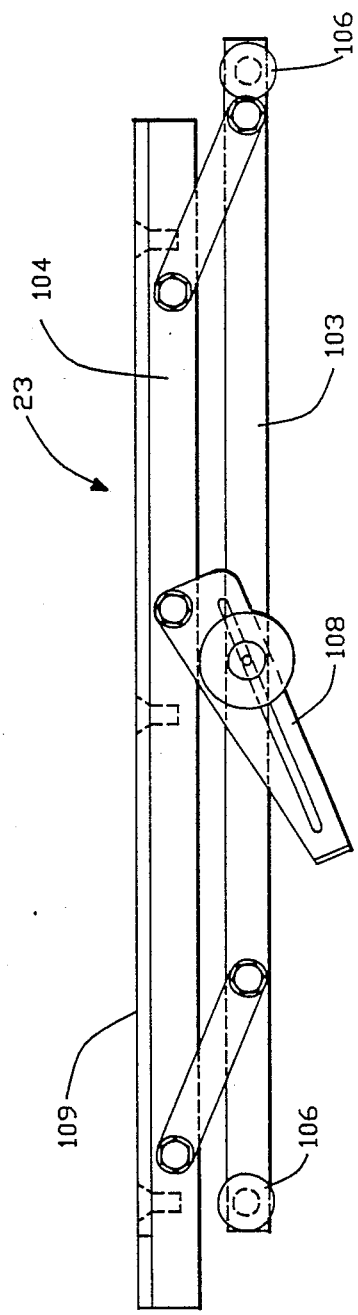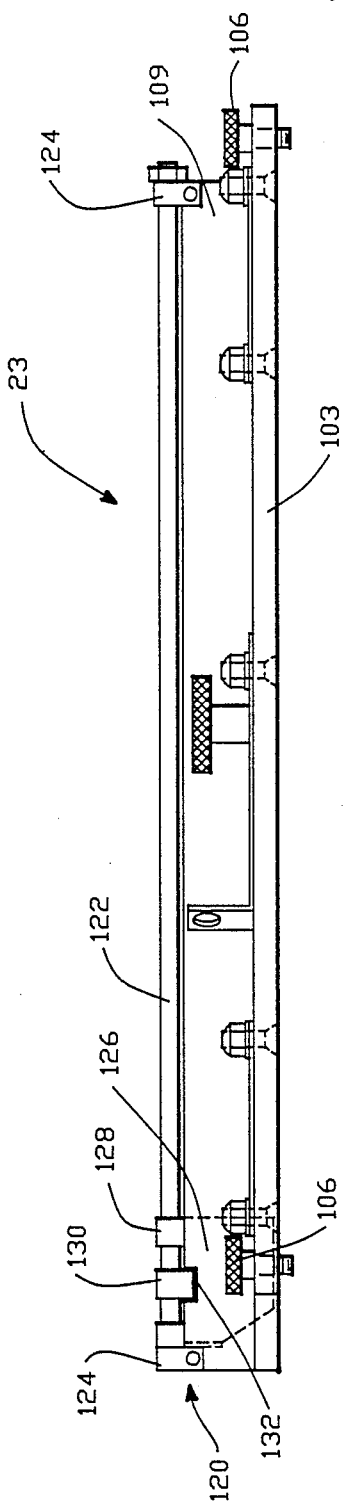

PRODUCTION TABLE SAW

The present invention relates generally to an improved safety table saw. More particularly, the invention relates to a multi-functional saw that utilizes a foot operated pedal to lift the sawblade to an operating position and causes a safety guard to move into a protective position over the blade anytime the saw is in operation.

BACKGROUND OF THE INVENTION

There are a wide variety of known table saws which are used for cutting and ripping wood. Generally, a table having a flat working surface in provided on top of a work stand. For safety reasons, it is desirable to utilize a safety blade guard which covers the blade when the saw is in use. The blade guard is intended to protect against wood chips or the like being thrown from the saw and prevents the operator from getting caught by the saw. One conventional safety guard arrangement is shown in U.S. Pat. No. 4,249,442. As seen therein, a shield is pivotally coupled to the back edge of the table and the operator may manually lift and/or drop the shield. Although such an arrangement is much safer than unguarded sawblades, there is always a chance that the saw will be inadvertently started while the guard is up, thereby leaving an unprotected blade and increasing the risk of accidents. Further, the blade may be exposed when the saw is not in use, which also cause injuries.

SUMMARY OF THE INVENTION

Accordingly, it is a primary objective of the present invention to provide an improved table saw wherein the saw blade is stored in an unexposed position when not in use.

Another objective is to provide a table saw having a safety guard that automatically protects the saw blade anytime the blade is exposed.

Another objective of the invention is to provide a table saw having a foot operated pedal that controls the operation of the saw.

Another objective of the invention is to provide a table saw that is capable of protecting the blade while making angled cuts.

To achieve the foregoing and other objects and in accordance with the purpose of the present invention, are improved foot operated production saw is disclosed. The production saw includes a work stand having an internal cavity and a working surface with a blade slot. The saw blade is movable from an unexposed position that is fully received by the work stand to an exposed position wherein at least a portion of the blade is exposed through the blade slot. A foot operated mechanism that includes a foot pedal is provided to move the saw blade between the unexposed position to the exposed position which is suitable for cutting.

The foot operated mechanism cooperates with a safety guard to protect the blade while the saw is in operation. The connection between the foot pedal and the safety guard is arranged to insure that the safety guard is always placed over the saw blade when the blade is exposed through the blade slot.

In a preferred embodiment, the work stand further includes a turn table that forms a portion of said working surface. The blade slot forms a portion of the turn table. The saw blade and a drive means that includes a motor are carried by the turn table to insure that the orientation of the blade will vary with rotations of the turn table.

In another preferred aspect of the invention, an intermediate switch arrangement is provided for starting the motor only when the foot operated means has been activated. Additionally a power switch that has on and off positions is provided as a master kill switch. The power switch must be in the on position for the production saw to operate.

In another preferred embodiment of the invention, the foot pedal is mounted to the work stand and the foot operated mechanism includes cable means for coupling the foot pedal to a rocker arm that pivotally supports the saw blade and drive means to translate movements of the foot pedal into rotations of the rocker arm for the egress of the saw blade through the blade slot. The cable means preferably includes an elongated cable having a first end attached to the foot pedal and a second end attached to the rocker arm. A plurality of pulleys define a specific path that the cable must follow, with one of the pulleys being centered at the pivot point of the turn table.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 3 is a diagrammatic side view of the production saw shown in FIG. 1.

FIG. 4 is a diagrammatic top view of the work table with the blade guard removed.

FIG. 17 is a side view of the rip fence.

FIG. 18 is a side view of the rip fence shown in FIG. 17 highlighting the push stick arrangement.

DETAILED DESCRIPTION OF THE DRAWINGS

Figure 1:
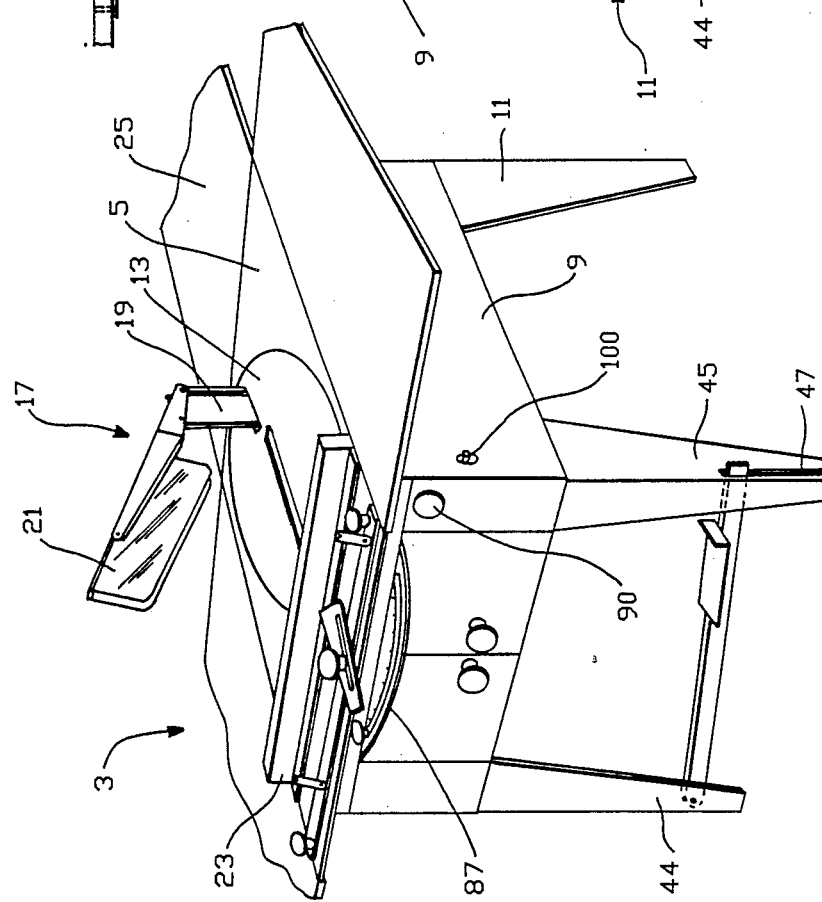
FIG. 1 is a diagrammatic perspective view of a production saw made in accordance with the present invention.
Figure 5:
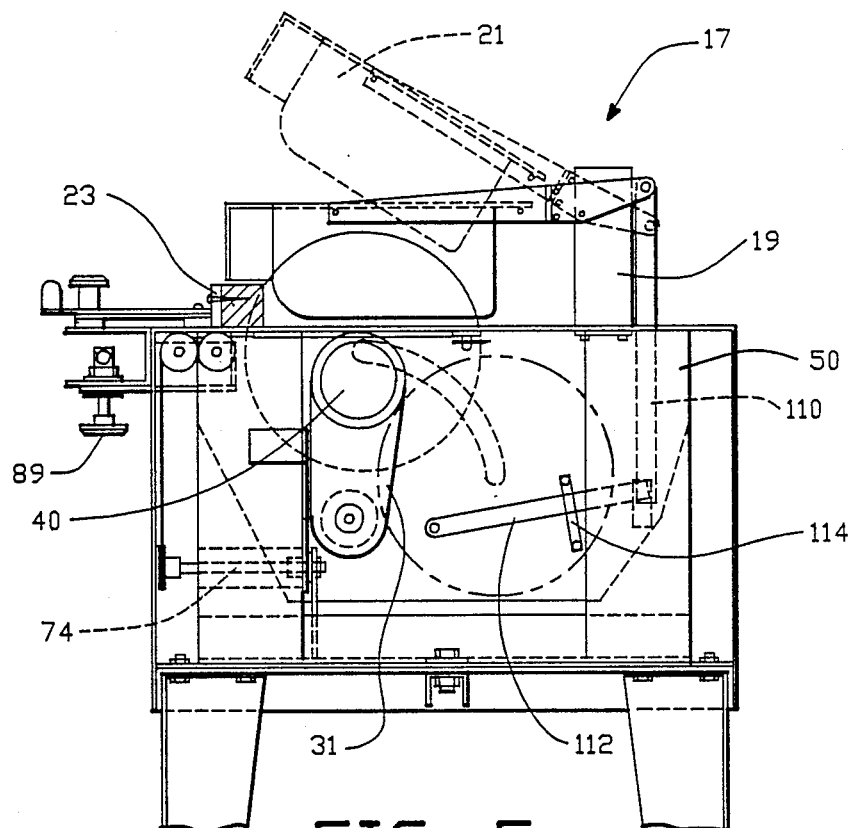
FIG. 5 is a cutaway side view of the production saw show FIG. 3 with the side cabinet wall removed.

As illustrated in the drawings, with initial reference to FIG. 1 the embodiment of the production saw 1 chosen for the purposes of illustration includes a work stand 3 having work table 5 with a working surface 7 mounted on top of a cabinet 9 that is supported by legs 11. The work table includes a turn table 13 having an elongated blade slot 15 therein. A safety blade guard 17 includes a support member 19 that is firmly attached to the turn table 13 and a guard member 21 that is pivotally coupled to the support member 19. The guard ;member is moveable from a lowered protective position that covers substantially all of the blade slot 15 to a raised clear position as seen in FIG. 5. A detachable guide fence 23 may be secured to the fixed portion of the working surface along any of the front three edges of the table to function as a cutting board, rip fence or otherwise provide a guide for cutting. One or more extension tables 25 may be coupled to the work stand to effectively extend the size of the working surface to facilitate handling large sheets or pieces of lumber.

Figure 15:
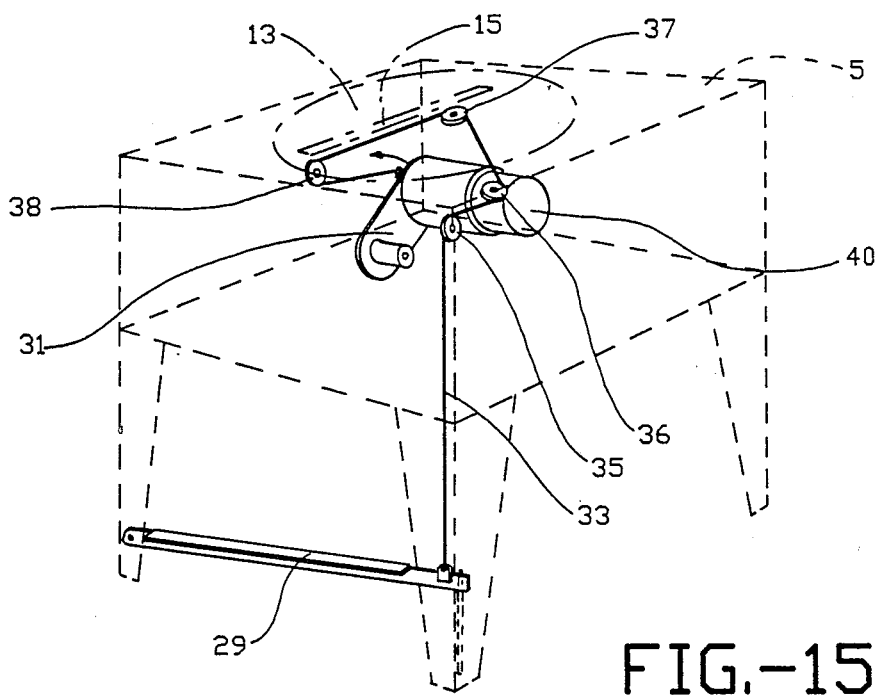
FIG. 15 is a diagrammatic perspective view of the pulley and cable layout for rotating the rocker arm.

The production saw described combines the features of a table saw, a radial saw, a miter saw, a chop saw and a swing saw into one portable unit. For safety reasons, the saw is arranged such that under normal conditions, when the saw is not in use, its blade 27 will be recessed within the cabinet 9 to insure that the blade is not exposed. Referring primarily to FIGS. 1 & 15, a foot operated treadle 29 is coupled to a rocker arm 31 that carries the rotary saw blade 27 by a cable means that takes the form of an elongated cable 33 and a plurality of pulleys 35-38. The rocker arm 31 is arranged such that the saw blade 27 it carries is moveable between an exposed position, wherein a portion of the blade is exposed above the blade slot 15 to an unexposed protected position that is fully received by the cabinet 9 as shown in FIG. 5. The rocker arm also carries a motor 40 that drives the saw blade 27. Specifically, the motor 40 is mounted to one side of the rocker arm and has a drive shaft (not shown) that extends past the rocker arm.

Figure 2:
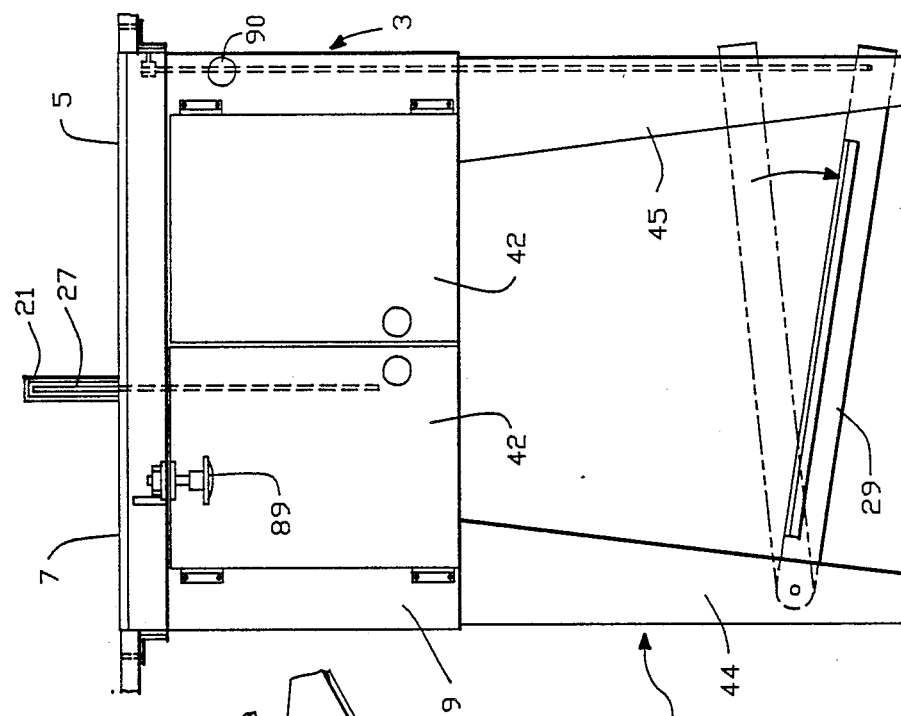
FIG. 2 is a diagrammatic front view of the production saw shown in FIG. 1 with the guide fence removed.

The cabinet 9 has a pair of doors 42 that provide access to the interior of the cabinet as seen in FIG. 2. Inside the cabinet, a mounting plate 50 is suspended from the turn table 13 by a pair of hinges 52 as can best be seen in FIGS. 5-8. The mounting plate 50 is adapted to carry the rocker arm 31 and thus, the saw blade 27 and the motor 40. The hinges 52 are arranged so that the mounting plate is pivotable relative to the longitudinal axis of the blade slot 15. Thus, the cutting angle of the saw blade relative to a vertical plane will vary directly with the pivotal rotations of the mounting plate. This allows the blade angle to be set for various bevel cuts. It is noted that the hinges are arranged to insure that the rotational axis of the mounting plate is disposed immediately adjacent the blade slot and thus is very near to the point where the saw blade will actually protrude through the blade slot. This arrangement allows the blade's bevel angle to be readily changed without having to adjust blade's mounting as is required in many prior art table saws.

The rocker arm 31 is pivotally coupled to a pivot point 55 on the lower end of the mounting plate. The mounting plate 50 also has an arcuate slot 54 which both guides and limits the pivotal movements of the rocker arms. The length of arcuate slot 54 is arranged to insure that the saw blade 27 will be fully received by the cabinet when the rocker arm is lowered and to limit the forward distance that the blade will travel to insure that it will remain within the confines of blade slot 15.

Figure 21:
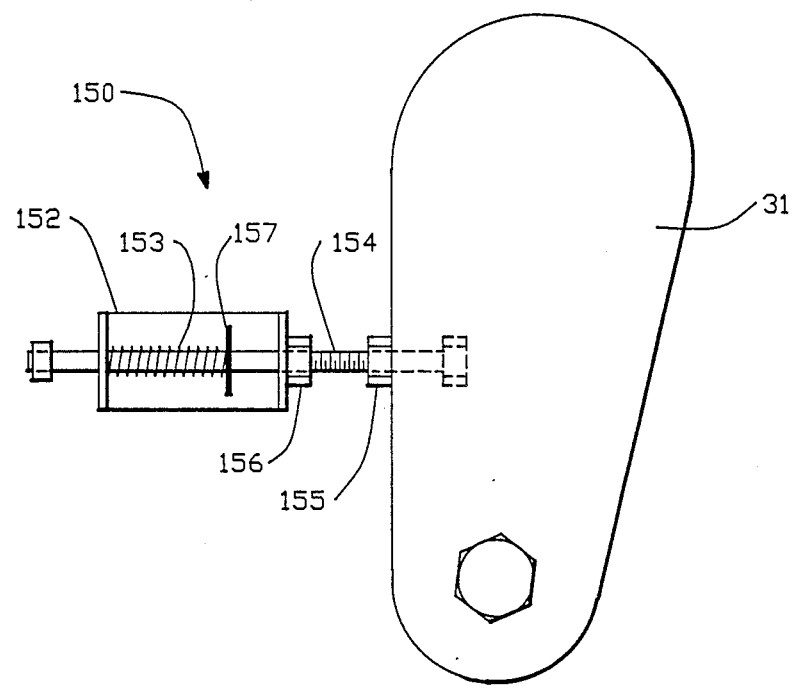
FIG. 21 is an enlarged, side elevation view, corresponding to FIG. 5, of the spring loaded stop assembly for the rocker arm with the rocker arm in a position exposing the blade.

To limit the motions of the rocker arm and to prevent the saw arbor from physically contacting the under end of arcuate slot 54, a spring loaded stop 150 is provided as shown in FIG. 21. The stop 150 includes a U-shaped bracket 152 that carries a spring loaded rod 154. The rod 154 includes an enlarged strike pad 155 and a stop member 156 which positively limits the rocker arms travel. In practice, the rod may take the form of a bolt with string pad 155 forming its head and stop member 156 threadably engaged thereto. A compression spring 153 disposed between one arm of U-shaped bracket 152 and a plate 157 carried by the rod within the center confines of U-shaped bracket 152 provides a cushioning effect when the rocker arm comes up against the stop. It also tries to push the rocker arm away from the stop towards the lowest position, which helps insure that the blade will return to the lowered, unexposed position when foot pressure is taken off treadle 29.

Figure 22:
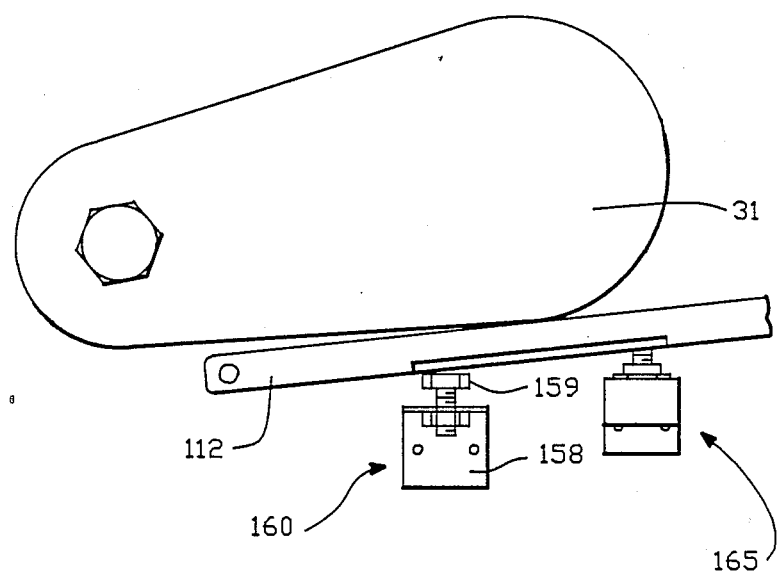
FIG. 22 is an enlarged, side elevation view, corresponding to FIG. 5, of the bottom stop assembly with the rocker arm in the protected position.

Referring next to FIG. 22, it can be seen that a bracket 158 secured to mounting plate 50, joins with bolt 159 to form the bottom stop 160. Specifically, as the rocket arm 31 lowers, it engages linkage arm 112 (described below) which in turn is restricted by stop 150.

Referring primarily to FIGS. 1-3 and 15, the foot treadle 29 is mounted between the front legs 11 of work stand 3. A first end of the treadle is pivotally coupled to leg 44,45 while the second end of the treadle is confined within a slot 47 in leg 45. A rubberized foot pad 48 is mounted near the second end of the treadle 29 to facilitate easy foot operation. As can best be seen with reference to FIG. 15, the treadle is coupled to a first end of an elongated cable 33 that is routed over a plurality of pulleys 35-38 to the rocker arm 31. The second end of elongated cable 33 is coupled to an eye bolt disposed near the top (free) end of the rocker arm. To insure that the saw will always return to the unexposed position when pressure is not being applied to the treadle 29, the arcuate slot 54 in mounting plate 50 is arranged such that the center of gravity of the rocker arm and the components that it carries (i.e. the motor 40 and saw blade 27) will always be to one side of the pivot point 55. Thus, as can best be appreciated by reference to FIG. 15, when pressure is taken off of the foot treadle, the weight of motor 40 and the other components carried by rocker arm 31 will cause the rocker arm to lower itself bringing the saw blade 27 back to the unexposed position.

The pulleys 35-38 are positioned to enable the elongated cable to pivot the rocker arm regardless of the orientation of the turntable 13 and/or the mounting plate 50. In the embodiment chosen for the purpose of illustration, pulley 35 is oriented in a vertical plane at the top-front-right inside corner of the cabinet 9 and translates the cable from a vertical line to a horizontal path. The cable then passes over pulley 36, which is oriented in a horizontal plane and located along the top-right side of the cabinet to direct the cable towards pulley 37 which is disposed at the center of rotation of turn table 13. The cable then passes through pulley 38 disposed near the outer perimeter of the turntable and to the eye bolt on the top end of the rocker arm. Pulley 37 is in the horizontal plane, while pulley 38 rests in a vertical plane. With the arrangement described and shown in FIG. 15, both the turn table 13 and the mounting plate 50 can be pivoted over their entire range of motion without significantly effecting the distance covered by the elongated cable between a fixed foot treadle position and a fixed rocker arm position. Thus, it is not necessary to adjust the cable length with rotations of either the blade bevel angle or the turn table 13.

Figure 11:
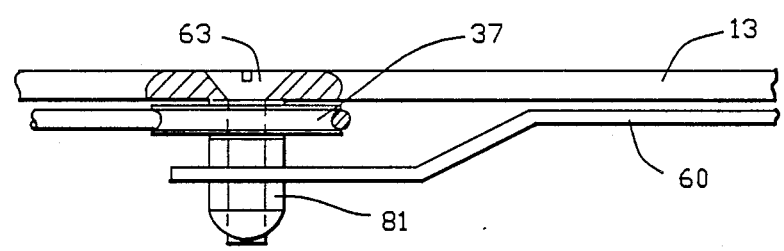
FIG. 11 is a side view of the coupling between the stabilizer and the pivot pulley.
Figure 12:
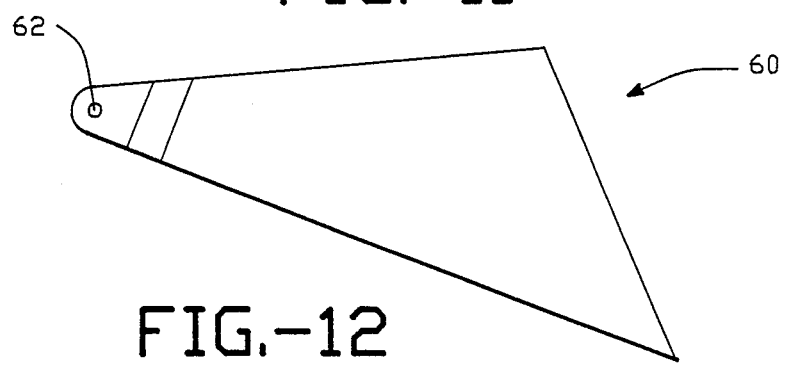
FIG. 12 is a top view of the stabilizer shown in FIG. 11.

To support both turn table 13 and the pulley 37 located at its center of rotation, a stabilizer arm 60 is provided as can best be seen in FIGS. 11 and 12. The stabilizer arm 60 is substantially triangular in configuration and extends between the right-rear-top inside corner of the cabinet and the turn tables center of rotation. This corner is chosen so as not to interfere with movements of either the saw blade or the elongated cable. The base end of the stabilizer bar is welded to the cabinet. Referring next to FIG. 11, the free end dips underneath the pulley 37 and includes a screw hole 62 for receiving a screw 63 which fastens the pulley 37 and stabilizer arm 60 to the turn table 13.

Figure 6:
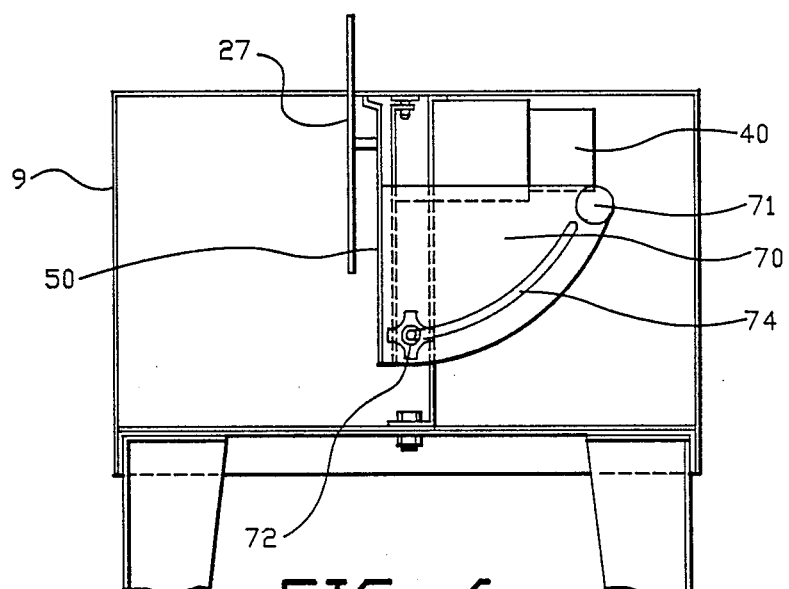
FIG. 6 is a cutaway front view of the production saw shown in FIG. 2 with the front cabinet wall removed.
Figure 7:
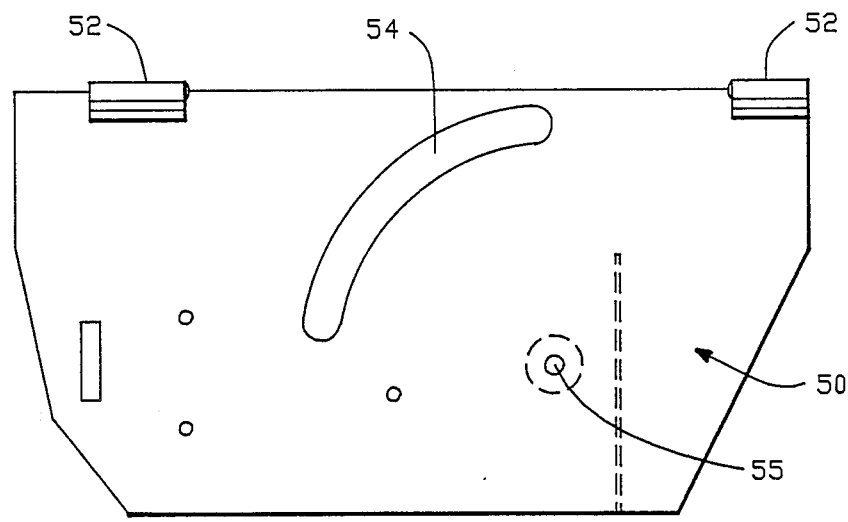
FIG. 7 is a side view of the mounting plate shown in FIG. 5.
Figure 8:
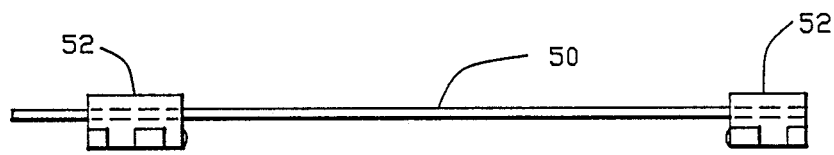
FIG. 8 is a top view of the mounting plate shown in FIG. 7.
Figure 20:
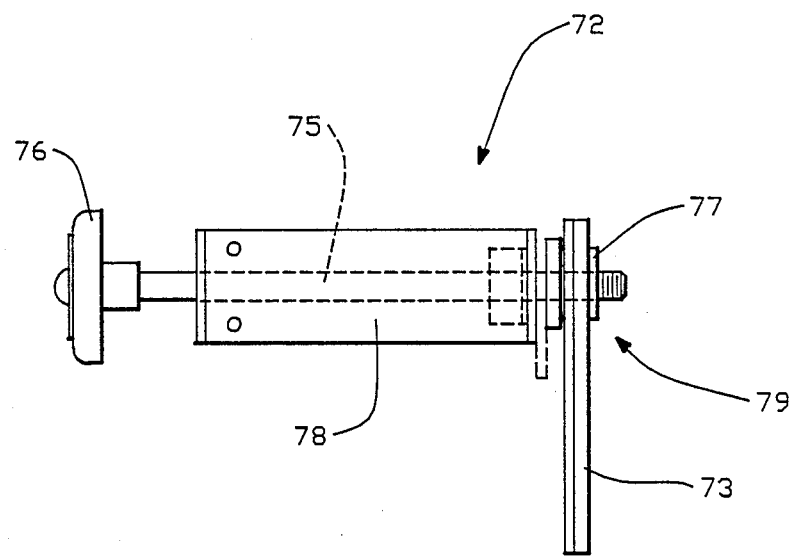
FIG. 20 is an enlarged, side elevation view, corresponding to FIG. 5, of the locking knob assembly for the bevel control.

Referring next to FIG. 6, the bevel control will be described. A positioning plate 70 is secured to the front edge of mounting plate 50 and extends perpendicularly to mounting plate in parallel with the front wall of cabinet 9. By way of example, the mounting plate and the positioning plate may be welded together. The positioning plate 9 includes a handle 71, a locking knob 72 and an arcuate slot 74. The handle extends outward towards the front wall so that it is easily accessible by the operator. The lock knob 72 is secured to a support member 73 that is mounted to the bottom of the cabinet. The lock knob is detailed in FIG. 20 and includes a threaded bolt 75 having a knob 76 on its exposed end and a square nut 77 on the opposite end. A sleeve 78 is fixedly secured to the bolt 75. The square nut 77 is designed to cooperate with a square opening 79 in support member 73 to provide a solid base for the bolt. The positioning plate is disposed between the sleeve 78 and the support member 73 such that when knob 76 is turned inward, the sleeve will clamp down upon the positioning plate to firmly hold it in place. The arcuate slot 74 is arrange so that as the positioning plate is rotated, the bolt 75 will pass therethrough. The size of the arcuate slot is chosen to allow the desired range of bevel cuts. Typically, it is only necessary to provide a range in the vicinity of 45° since the workpiece can be readily flipped to accommodate shallower cuts. In the embodiment chosen for the purposes of illustration, the slot accommodates a range of 47° in one direction from perpendicular to the table surface. Calibration marks are provided adjacent to the slot to provide a scale that the operator can use to select any particular angle for the bevel cut. It should be appreciated that with the handle and knob arrangement described, the bevel angle can be readily set by the operator. The positioning plate and the bevel control components described herein are all disposed inside of the cabinet. Thus, none of the handles, etc. extend outward into a position where the operator may inadvertently get caught on them during use.

Figure 9:
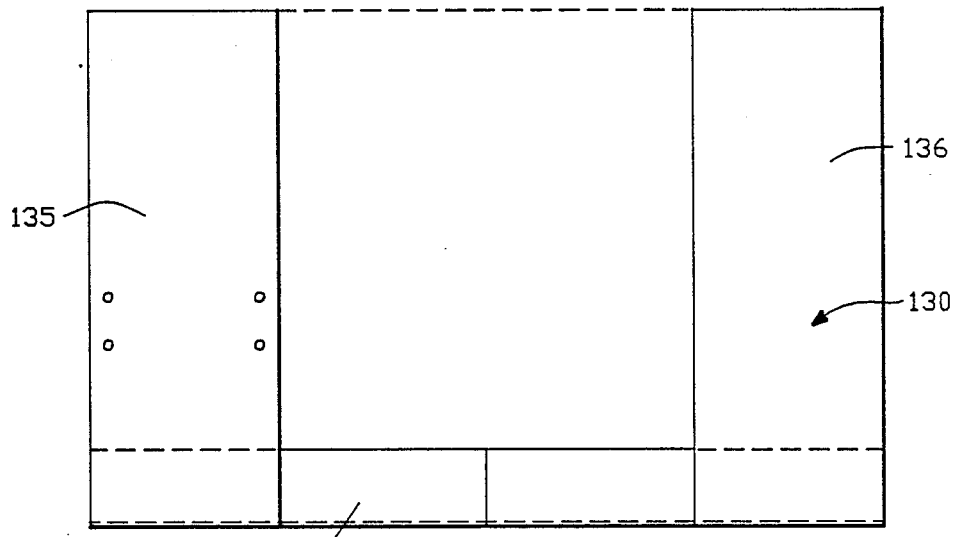
FIG 9 is a side view of the support panel shown in FIG. 5.
Figure 10:
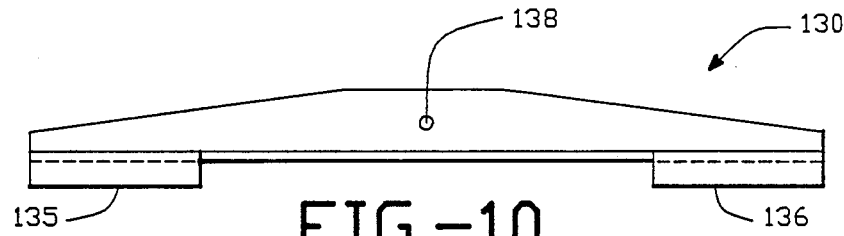
FIG. 10 is a top view of the support panel shown in FIG. 9.

The turn table 13 is also rotatable. As can best be seen in FIG. 11, the stabilizer arm 60 carries a bushing 81 which allows the turn table 13 to rotate relative thereto. A support panel 130 is provided to support the turn table 13. The support panel, which is detailed in FIGS. 9 and 10, includes bottom member 134 and side members 135, 136. The side members are welded to the turn table 13 and extends to the bottom of cabinet 9. A post 132 is centered on the bottom of the cabinets and the post extends upward and is received by an opening within the bottom member 134 of the support panel. Thus, the turn table is rotatably coupled to the cabinet by both screw 63 and post 132. It should be appreciated that the support panel rotates with the turn table and is positioned such that it will not interfere with the pivotal movements of mounting plate 50. Further, the side members 135, 136 are spaced apart so that motor 40 will pass therebetween at all times over its entire range of movements as it is carried by the rocker arm 31. Like the bevel adjustment, the turn table needs only be rotatable in the vicinity of 45 degrees in order to accommodate all types of cuts. As can best be seen with reference to FIGS. 1 and 4, a positioning arm 85 is welded to the turn table and extends toward the front of the work stand. The angle adjustment mechanism 83 is carried by the free end of the positioning arm. A calibrated alignment plate 87 is secured to the work table by a bracket and extends forward from the cabinet. The alignment plate has an arcuate alignment slot that receives the adjustment mechanism 83 carried by the positioning arm 85 as the turn table is rotated back and forth. The desired table position is first selected and the alignment mechanism is locked to firmly hold the turn table in place. A suitable alignment mechanism may be fabricated from a threaded bolt and nut with an appropriately sized knob 89 placed on the bolt to facilitate tightening the bolt.

Figure 16:
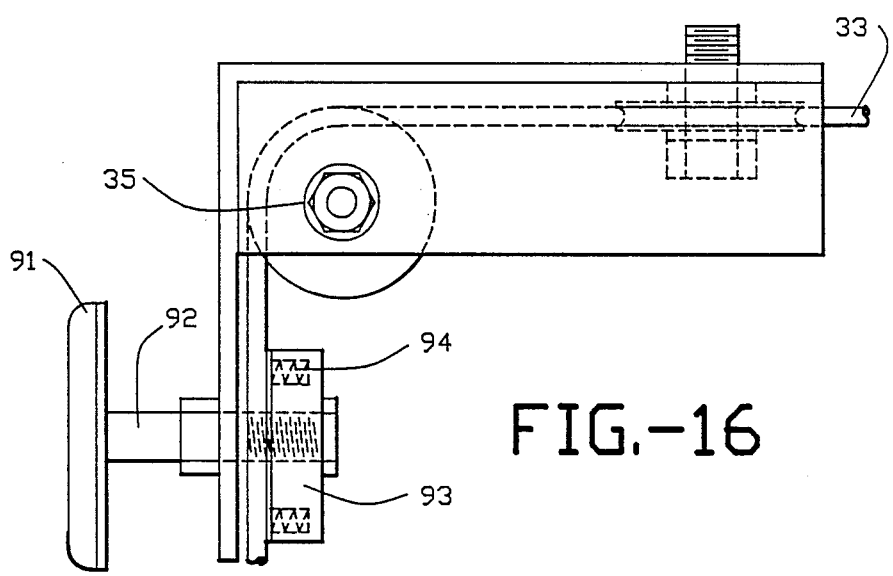
FIG. 16 is a diagrammatic back view of the rip lock arrangement.
Figure 13:
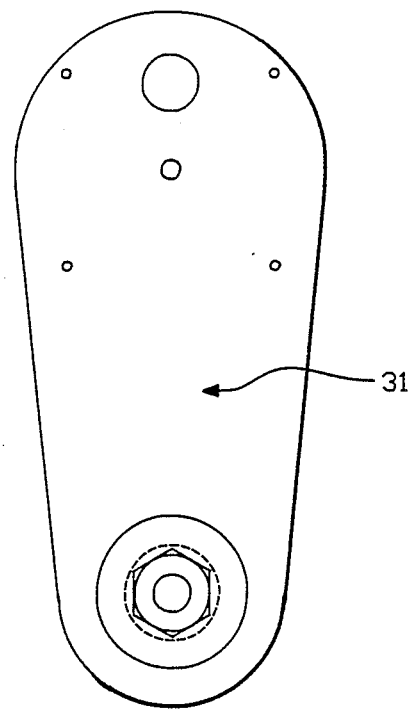
FIG. 13 is a side view of the rocker arm that supports the sawblade.
Figure 14:
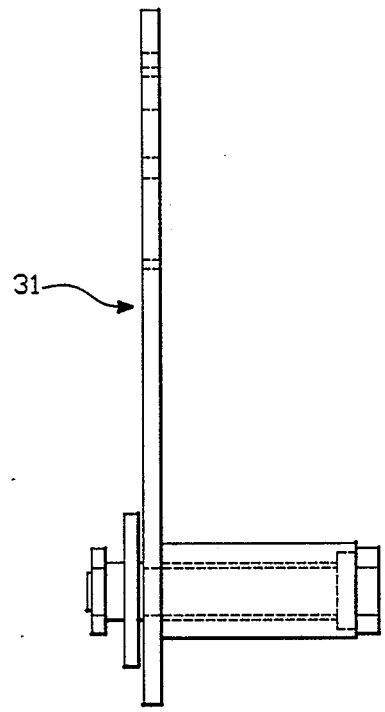
FIG. 14 is a front view of the rocker arm shown in FIG. 13.

To facilitate ripping and other extended cuts, a rip lock 90 is provided which will hold the blade in any particular chosen position, regardless of foot pressure on the treadle. In the embodiment chosen for the purposes of illustration, the rip lock is arranged to clamp the elongated cable 33 in place once the desired saw blade position has been attained. The rip lock 90 is detailed in FIG. 16 and includes a hand held knob 91 disposed on the end of bolt 92, a backing member 93 threadably engages the bolt 92 and is disposed on the opposite side of elongated cable 33. Thus, when knob 91 is rotated in a clockwise direction, the backing member 93 is drawn towards the cabinet walls and thus clamps down on the elongated cable 33. A pair of compression springs 94 are placed within backing member 93 on opposite sides of bolt 92 and are adapted to engage the walls of cabinet 9 to push the backing member away from the cabinet walls. Thus, when pressure is released by loosening the bolt, the backing member will be pushed away from the elongated cable allowing its free movement.

The safety blade guard is arranged to automatically position itself over the saw blade when the blade is in the exposed position.. To accomplish this, the guard member 21 is pivotally coupled to the support member 19. Linkage bars 110, 112 are provided to drive the pivotal movements for the guard member. The support member 19 is mounted directly onto the mounting plate 50, so that it will always remain fixed in relation to the saw blade 27.

Thus, as the mounting plate 50 is pivoted to provide bevel cuts, the guard member 21 will pivot in unison. It should be appreciated that the opening in turn table 13 through which support member 19 protrudes, is sufficiently large so that it does not interfere with movements of the blade guard 17. A first end of linkage bar 110 is secured to the guard member 21 near its pivotal connection with the support member 19. The second linkage bar 112 has one end coupled to the mounting plate 50 and its opposite end attached to the free end of linkage bar 110 as best seen in FIG. 5. Linkage bar 112 is arranged to cooperate with the rocker arm 31 such that when the rocker arm is fully lowered, then the motor 40 will press down on linkage bar 112, which pulls down the back side of guard member, thereby raising the guard. When the rocker arm is lifted, and thus pressure is taken off of linkage bar 112, the weight of the guard member 21 which is cantilevered from the support member 19 will cause the guard to return to the protective position over the blade slot. It should be appreciated that the linkage bar 112 is positioned such that it will only engage the motor after the blade has been fully received inside the cabinet. With such an arrangement, the guard will only be lifted when the blade is unexposed. A protective bracket 114 insures that linkage bar 112 stays close to the mounting plate although it is not intended to limit the motions of the linkage bar.

The guard member 21 is transparent and includes a reversible deflector at its distal end to facilitate directing debris from the shield to either the right or left.

Power is connected to the motor 40 through a two stage switch arrangement. A kill switch, which may take the form of toggle switch 100 is provided along the right side of the cabinet. A secondary power saving switch 165 is provided that turns on the saw only when the blade is raised above a preselected spot so that when the saw is not in use, the blade will not be turning.

The intermediate switch is arranged such that when rocket arm 31 is lower, pressing down upon linkage bar 112, the linkage bar 112 will press down on intermediate switch 165 which cuts power to motor 40. When the saw is raised, linkage bar 112 rises, opening switch 165, which turns on the motor if toggle switch 100 is in the "on" position.

The guide fence 23 has a pair of parallel beams 103, 104 that are coupled by a pair of pivotal linkage bars. BEam 103 is secured to the work table by a pair of anchor knobs 106 located at its opposite ends. The anchor knobs 106 are hand operable and include threaded bolts that are arranged to screw into threaded boreholes in the working surface of the worktable. The boreholes are arranged so that the guide fence can be placed along either the front or sides of the work table. An adjustment arrangement 108 is provided to facilitate changing the distance between beams 103 and 104. Beam 104 has a raised fence 109 on its inner surface that may act as a guide when ripping or otherwise positioning a board. Additionally, the fence may be arranged to carry a cutting board that will protect the fence when it is positioned directly in front of the blade. The cutting board itself would typically take the form of a relatively small strip of hardwood.

Figure 19:
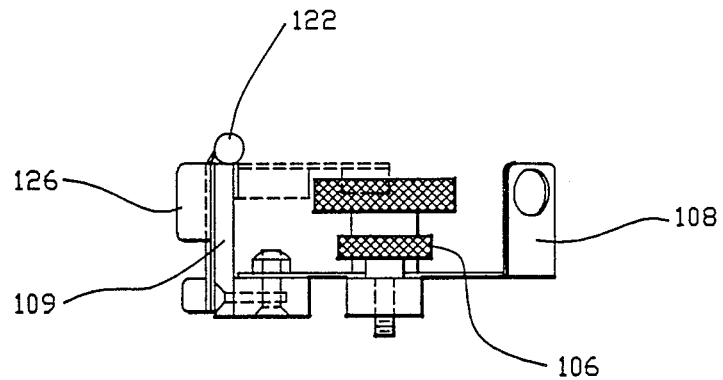
FIG. 19 end view of the rip fence shown in FIG. 18 highlighting the push stick arrangement.

To facilitate ripping small cross sectional pieces, a push stick is attached to the top surface of the guide fence. The push stick is particularly useful when no cutting board is being used. Referring next to FIGS. 18 and 19, the push stick 120 includes a carriage rod 122 that is secured to the top surface of the guide fence by a pair of brackets 124. A push pad 126 has a pair of hinge type sleeves 128 that are journaled about the carriage rod such that the push pad may be pushed back and forth along the carriage rod. As can best be seen by referring to FIG. 19, the push pad may be placed in the operational position shown in solid lines in FIG. 19 or flipped to the storage position shown in dotted lines therein. When the push pad is not in use, it would typically be kept in the storage position so as not to interfere with the operation of the guide fence. The push pad also has a safety lock 130 intended to cooperate with a recess 132 in the guide fence to prevent the push pad from moving back and forth when it is placed in the storage position. It should be apparent that the push pad can be used when ripping narrow pieces of wood and/or cutting other small pieces wherein the operators hand will have to get close to the saw blade. As will be appreciated by those skilled in the art, the use of the push pad will eliminate the need for the operator to actually contact the wood in the vicinity of the blade, which substantially reduces the risk that the blade throwing the workpiece will inadvertently cause the operator to get caught by the blade.

Although only a few embodiments of the present invention have been described herein, it should be understood that the present invention may be embodied in many other specific forms without departing from the spirit or scope of the invention. Particularly, it should be appreciated that the actual layout of the various components, such as the work table, the mounting plate, the rocker arm, the elongated cable and the like may all be widely varied within the scope of the invention. Further a wide variety of other features conventional features could be added to or substituted for the described components. For example, the linkage means for coupling the safety guard to movements of the saw blade and the guide fence may be widely varied. Therefore, the present examples and embodiments are to be considered as illustrative and not restrictive, and the invention is not to be limited to the details given herein, but may be modified within the scope of the appended claims.

I claim:

1. A production saw comprising:
   a work stand having an internal cavity, a working surface, a blade slot in the working surface, the rotatable plate carrying said blade slot;
   a saw blade movable from an unexposed position fully received by said work stand to an exposed position wherein at least a portion of the blade is exposed through said blade slot to a facilitate cutting;
   drive means for driving the saw blade to facilitate cutting through a workpiece;
   a safety guard for protecting the blade while the saw is in operation;
   foot operated means for moving the saw blade between said unexposed position and said exposed position at all working orientations of the rotatable plate, the foot operated means cooperating with the safety guard to insure that the safety guard is always placed over the saw blade when the blade is exposed through said blade slot and for lifting the safety guard away from the blade slot when the blade is in said unexposed position, said foot operated means including a rocker arm that carried said saw blade and said drive means and a foot pedal mounted to said work stand and coupled to the rocker arm such that movements of the foot pedal cause the rocker arm to pivot, wherein said pivot movements of said rocker arm translate said blade between said exposed and unexposed positions, said foot operated means further including means for coupling said foot pedal to said rocker arm to translate movements of said foot pedal to rotations of said rocker arm for the ingress and egress of the saw blade through said blade slot, said cable mans including an elongated cable having a first end attached to said foot pedal and a second end attached to said rocker arm, and a plurality of pulleys defining a specific path that the cable must follow, a first one of said pulleys being mounted at the pivot point of said rotatable plate.

2. A production saw as recited in claim 1 wherein said saw blade and said drive means are carried by the rotatable plate to insure that the orientation of the blade will vary with rotations of the rotatable plate.

3. A production saw as recited in claim 2 further comprising a mounting plate pivotally coupled to the rotatable plate for carrying said drive means and said saw blade, wherein pivotal movements of said mounting plate vary the bevel angle of the saw blade and wherein the foot-operated means operates to move the saw blade between said exposed and unexposed positions regardless of the orientation or bevel angle of the saw blade.

4. A production saw as recited in claim 1 further comprising linkage means for cooperating with said rocker arm to insure that said safety guard is always placed over the saw blade when the blade is exposed through said blade slot.

5. A production saw as recited in claim 4 wherein said linkage means includes a first linkage bar that is pivotally mounted to said work stand in a position such that said rocker arm or an element carried thereby will engage said first linkage bar only when said saw blade is not exposed through said blade slot, said linkage means being arranged such that when said first linkage bar is not engaged by said rocker arm or an element carried thereby, the safety guard will be placed over said blade slot.

6. A production saw as recited in claim 1 wherein the workstand further includes a cabinet having said internal cavity and a plurality of legs extending downward from the cabinet for supporting the cabinet, and wherein the work surface further includes a turntable fixedly mounted to the cabinet.

7. A production saw as recited in claim 1 further comprising switch means for activating said drive means to drive the saw blade, said switch means including intermediate means for starting the motor only when the foot operated means has been activated.

8. A production saw as recited in claim 7 wherein said switch means further includes a power switch having on and off positions, wherein said power switch must be in the on position for the production saw to operate.

9. A production saw comprising:

a work stand having a working surface, a cabinet with an internal cavity, a fixed work table coupled to the top of said rotatable plate that forms a portion of the working surface and includes a blade slot having a longitudinal axis;

a rocker arm pivotally coupled to the rotatable plate;

a saw blade carried by said rocker arm and movable from an unexposed position fully received by said work stand to an exposed position wherein at least a portion of the blade is exposed through said blade slot;

drive means carried by the rocker arm for driving the saw blade to facilitate cutting through a workpiece;

a safety guard for protecting the blade while the saw is in operation;

foot operated means for moving the saw blade between said unexposed position and said exposed position which is suitable for cutting at all working orientations of the rotatable plate, the foot operated means cooperating with the safety guard to insure that the safety guard is always placed over the saw blade when the blade is exposed through said blade slot and for lifting the safety guard away from the blade slot when the saw blade is in said unexposed position, the foot operated means including a foot operated pedal mounted to said work stand and cable mans for coupling said foot pedal to said rocker arm to translate movements of said foot pedal to rotations of said rocker arm for the egress of said saw blade through said blade slot, said cable means including, an elongated cable having a first end attached to said foot pedal and a second end attached to said rocker arm, and a plurality of pulleys defining a specific path that the cable must follow, a first one of said pulleys being mounted at the pivot point of said rotatable plate; and a mounting plate pivotally coupled to said rotatable plate wherein the rotational axis of the mounting plate is substantially parallel to the longitudinal axis of said blade slot, said rocker arm being carried by said mounting plate and having an axis of rotation substantially orthogonal to the rotational axis of the mounting plate such that the pivotal movements of said mounting plate will vary the bevel angle of the saw blade.

10. A production saw as recited in claim 9 further comprising linkage means for cooperating with said rocker arm to insure that said safety guard is always placed over the saw blade when the blade is exposed through said blade slot.

11. A production saw as recited in claim 10 wherein said linkage means includes a first linkage bar that is pivotally mounted to said work stand in a position such that said rocker arm or an element carried thereby will engage said first linkage bar only when said saw blade is not exposed through said blade slot, said linkage means being arranged such that when said first linkage bar is not engaged by said rocker arm or an element carried thereby, the safety guard will be placed over said blade slot.

12. A production saw as recited in claim 9 wherein mounting plate is coupled to said rotatable plate in a manner that insures that the saw blade will remain within the confines of the blade slot regardless of the pivotal position of the mounting plate.

13. A production saw as recited in claim 9 further comprising a guide fence for demountable attachment to the work table for supporting a workpiece during cutting.

14. A production saw as recited in claim 9 further comprising a stabilizer plate for securing said first pulley to said rotatable plate.

15. A production saw as recited in claim 9 further comprising an angle adjustment means for precisely measuring the pivotal position of the rotatable plate.

16. A production saw, comprising:
- a work stand having an internal cavity, a working surface, a blade slot in the working surface, and a rotatable plate that forms a portion of said working surface, the rotatable plate carrying said blade slot;
- a saw blade movable from an unexposed position fully received by said work stand to an exposed position wherein at least a portion of the blade is exposed through said blade slot to facilitate cutting;
- drive means for driving the saw blade to facilitate cutting through a workpiece;
- a safety guard for protecting the blade while the saw is in operation;
- foot operated means for moving the saw blade between said unexposed position and said exposed position at all working orientations of the rotatable plate, the foot operated means cooperating with the safety guard to insure that the safety guard is always placed over the saw blade when the blade is exposed through said blade slot and for lifting the safety guard away from the blade slot when the blade is in said unexposed position;
- guide means for positioning the workpiece relative to the saw blade, the guide means including a contact surface for positioning the workpiece as it passes through the saw blade;
- a carriage rod carried by the guide means, the carriage rod having a longitudinal axis; and
- a push plate slideably mounted to the carriage rod and adapted to engage the workpiece without holding the workpiece in the vicinity of the saw by pushing on said plate, the push plate having a locked position wherein the push plate is held in place in a position that does not protrude beyond the contract surface of the guide means.

* * * * *